Jan. 2, 1951 A. H. DICKINSON 2,536,916

ELECTRONIC COUNTING SYSTEM

Filed Dec. 21, 1945 2 Sheets-Sheet 1

INVENTOR
A. H. Dickinson
BY
W. M. Wilson
ATTORNEY

Jan. 2, 1951    A. H. DICKINSON    2,536,916

ELECTRONIC COUNTING SYSTEM

Filed Dec. 21, 1945    2 Sheets-Sheet 2

INVENTOR
A. H. Dickinson
BY
W. M. Wilson
ATTORNEY

Patented Jan. 2, 1951

2,536,916

UNITED STATES PATENT OFFICE 2,536,916

ELECTRONIC COUNTING SYSTEM

Arthur H. Dickinson, Greenwich, Conn., assignor to International Business Machines Corporation, New York, N. Y., a corporation of New York Application December 21, 1945, Serial No. 636,527

3 Claims. (Cl. 250—27)

This invention relates to switching means and more particularly to electronic switching means grouped to function as a commutator or the like.

An object of the invention is to provide a group of switching elements operable in different sequences.

An object of the invention is to provide a series of switching elements operable selectively in either of two, relatively opposite sequences.

An object of the invention is to provide a system of switching elements grouped in commutator-like fashion and which may be successively switched in one sequence or in a different sequence.

An object of the invention is to provide an electronic commutator which is operable selectively in different directions.

An object of the invention is to provide a commutator-like system of electronic stages operable in one sequence or a different sequence.

An object of the invention is to provide a group of trigger circuits operable in different sequences.

An object of the invention is to provide a commutator comprising stages composed of electronic trigger circuits interrelated to function selectively in either one sequential order or in a reverse sequential order.

It is also one of the objects of the invention to provide a network of electrical switching circuits to produce electrical conditions in different sequences.

An object of the invention is to provide a commutator for producing electrical waves in different sequences.

An object of the invention is to provide a commutator-like system of electronic circuits to operate through one series of phases or through a different series of phases.

Stated differently, an object of the invention is to provide a commutator-like arrangement of electronic circuits which perform steps of one sequence or of another sequence.

It is also an object of the invention to provide a plurality of switching circuits of which one circuit has selectively different conditioning controls over the switching of another of the circuits.

More specifically, an object of the invention is to provide a plurality of trigger circuits, each having alternate, reverse states of stability, with one circuit conditioning another to be tripped to one state or to the reverse state.

An object of the invention is, further, to provide a series of trigger circuits, an intermediate one of which controls the flanking circuits in one way or in a different way, as required.

An object of the invention is to provide a commutator-like system of elements operable in different directions under control of a direction governing circuit.

The invention aims at a commutator-like system of electrical circuits and interrelating means therefor under joint control of the stages and of a direction governing device.

The invention further contemplates interrelating means, for a series of electronic trigger circuits, such as to electrically couple the trigger circuits for operation in one sequence or a different sequence.

An object of the invention is to provide means for conditioning a series of electrical circuits for sequential operation and which includes a plurality of sets of conditioning controls which may be selectively effective to control different sequences of operation of the electrical circuits.

An object of the invention is to provide a commutator-like system of stages operable by electrical pulses through one sequence or a different sequence.

An object of the invention is to provide a commutator-like system of electrical stages operable in either of opposite directions and reversible in direction without stopping its operation.

It may be stated that an object of the invention is to provide means for switching the commutator stages from one sequential order of operation directly into a different sequential order of operation without suspending operation of the commutator.

Another object of the invention is to provide an electronic commutator wherein common means in one stage conditions two of the other stages for operation.

More specifically an object of the invention is to provide a commutator composed of a series of trigger circuits, each having a pair of impedance networks, of which one network controls the two flanking trigger circuits.

Other objects of the invention will be pointed out in the following description and claims and illustrated in the accompanying drawings, which disclose, by way of examples, the principle of the invention and the best mode, which has been contemplated, of applying that principle.

Figure 1:
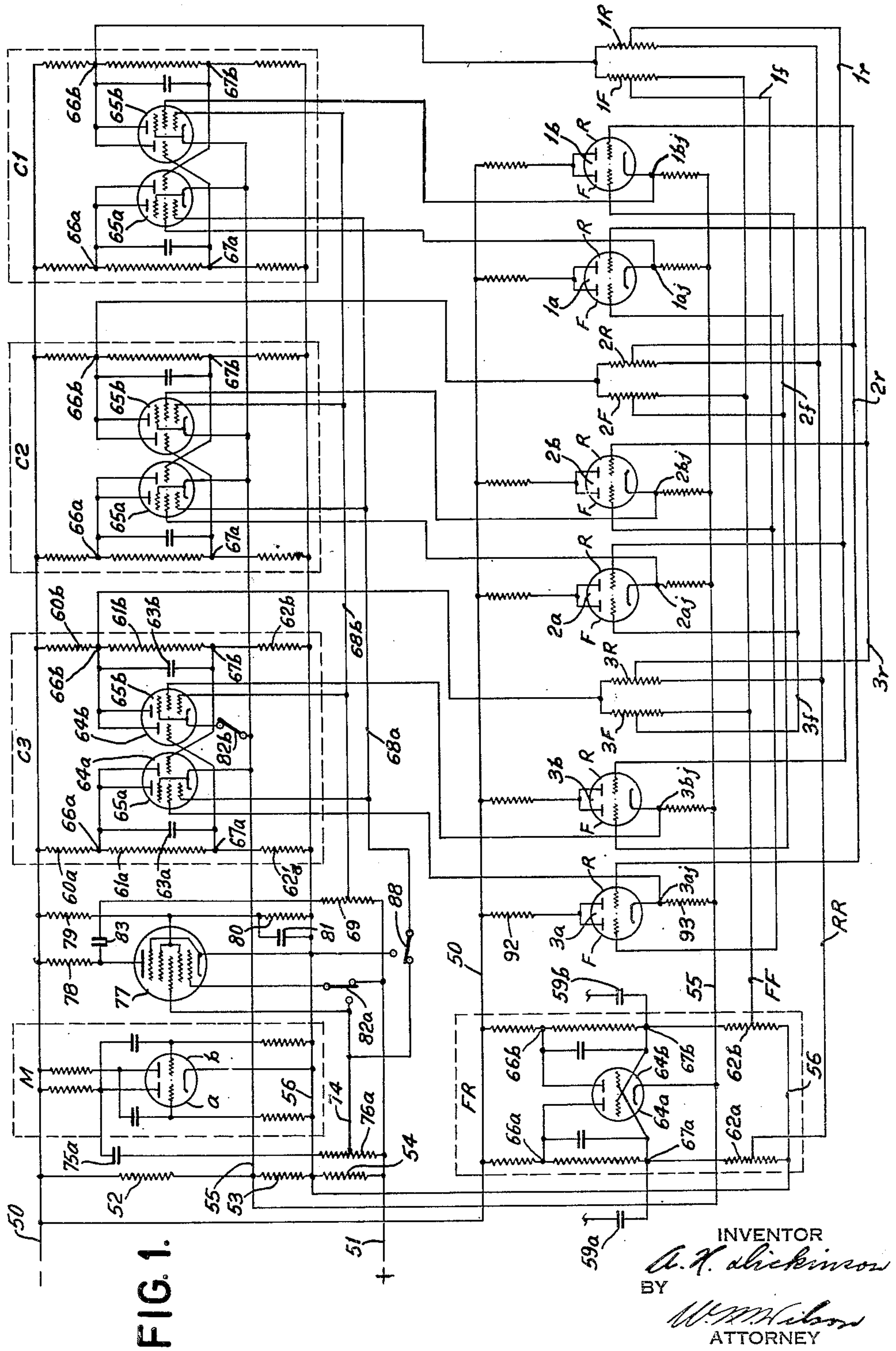
Fig. 1 is a circuit diagram illustrating the invention.

Referring to Fig. 1, the plus line 50 and minus line 51 are connected by a switch (not shown) to a suitable D. C. supply. A voltage divider consisting of resistors 52, 53, and 54 is across lines 50 and 51. Lines 55 and 56 tap the voltage divider at such points that line 55 is positive to line 56.

Pulses are required for driving the electronic commutator. The primary source of pulses used here is an oscillator of the conventional multivibrator type. In Fig. 1, the multivibrator is labeled M. As is known, this oscillator develops square pulses at the output of its two tubes *a* and *b*. In the present case, only the square pulses at the output of tube *a* are utilized. From these square pulses are derived sharp, steep wave front pulses for operating the commutator. For this purpose, the output of tube *a* is coupled to line 51 by a condenser 75*a* and resistor 76*a*. The condenser and resistor have an RC product so small as to differentiate the square pulses into sharp, steep wave front positive and negative pulses, of the character indicated in Fig. 2, line 1, upon resistor 76*a*. The positive pulses thus produced on 76*a* are utilized as advancing pulses for the commutator. Another series of pulses is required as restoring pulses for the commutator. This series of pulses is produced by a tube 77 under control of the pulses on resistor 76*a*. The tube 77 is a pentagrid mixer. Its anode connects to line 50 by a resistor 78 and its cathode connects to line 56. The output of the tube is coupled to line 51 by a condenser 83 and resistor 69. The #2 and #4 grids are connected in parallel to the junction of resistors 79 and 80 which are across the lines 50 and 56. A condenser 81 shunting resistor 80 aids in maintaining these grids at constant potential. The #1 grid is normally connected by a switch 82*a*, in the position shown, to line 51. The #3 grid is connected to a wire 74 which taps the resistor 76*a*. With this arrangement, the current flow in tube 77 varies with the positive and negative pulses received by the #3 grid from resistor 76*a*. Accordingly, positive and negative pulses are developed upon the resistor 69 of the general character indicated in Fig. 2, line 2, and it is noted that these pulses are 180 degrees out of phase with those on resistor 76*a*. The positive pulses upon resistor 69 are utilized as restoring pulses for the commutator.

The commutator comprises three stages C3, C2, and C1. Each stage is in the form of a trigger circuit having alternate and opposite states of stability, one of which is called here the on state and the other the off state. The trigger circuit has two symmetrical impedance branches or networks across lines 50 and 51. The left hand network comprises resistors 60*a*, 61*a*, and 62*a*, a condenser 63*a* shunting 61*a*, and a pentode 65*a* and triode 64*a* which have their space current paths connected in parallel between point 66*a* and line 55. The right hand branch includes a similar arrangement of corresponding parts 60*b*, 61*b*, 62*b*, 63*b*, 64*b*, and 65*b*.

The left and right hand branches are cross-coupled by connecting the grid of 64*a* to point 67*b* of the right hand branch and the grid of 64*b* to point 67*a* of the left hand branch. This arrangement provides alternate on and off states of stability, each self-sustaining until the circuit is reversed in status by a tripping pulse. In the off state, tube 64*a* is at cut-off and tube 64*b* is conductive. With resistor 60*a* properly chosen, when tube 64*a* is at cut-off, it has a high impedance relative to that of 60*a* and, therefore, its anode and connected point 66*a* are at high potential. With resistors 61*a* and 62*a* properly chosen, the drop across 61*a* when point 66*a* is at high potential does not force point 67*a* and, therefore, the grid of 64*b*, below cathode potential. The tube 64*b* is thus maintained at substantially zero bias in which condition it is conductive. With 64*b* conductive and resistor 60*b* properly chosen, the impedance of 64*b* is low compared to that of 60*b*, and the anode of 64*b* as well as connected point 66*b* are at a potential not much greater than cathode potential. With resistors 61*b* and 62*b* properly chosen, the drop across 61*b* when point 66*b* is at this low potential forces the point 67*b* and the connected grid of 64*a* below cathode potential sufficiently to maintain 64*a* at cut-off bias. It is seen, then, that with the trigger circuit in off state, it has a distribution of potential such as to sustain the circuit in off state, in which tube 64*a* is at cut-off, while tube 64*b* is conductive, and in which points 66*a* and 67*a* are at high potentials, while points 66*b* and 67*b* are at low potentials. Since the branches of the circuit are symmetrical, the same considerations apply, whether the circuit is in on or off state, with regard to the manner in which it is self-sustaining in its assumed state. Thus, when the circuit is in on state, it has a distribution of potential such as to maintain tube 64*a* conductive and tube 64*b* at cut-off, with points 66*b* and 67*b* at high potentials and points 66*a* and 67*a* at low potentials.

The circuit is reversible from off to on status under control of an advancing pulse (positive) from resistor 76*a* and reversible from on to off state under control of a restoring pulse (positive) from resistor 69. The pulses from 76*a* are fed via wire 74, a switch 88 in shown position, and a wire 68*a* to the control grids (hereinafter called grids) of pentodes 65*a* of all the circuits C3, C2, and C1. The pulses from resistor 69 are fed via a wire 68*b* to the grids of all the pentodes 65*b*. In normal commutator operation, the tripping pulses from resistors 76*a* and 69 are of insufficient amplitude to render the pentodes conductive unless their screen and anode potentials are at their high levels. With a circuit in off state, its point 66*a* is at high potential, as is the connected anode of the tube 65*a*. With a circuit in on state, its point 66*b* is at high potential and, therefore, the anode potential of tube 65*b* is high. The screen potentials are controlled by means described presently. Considering circuit C3, for example, as in off state the anode of its pentode 65*a* is at high potential. Assume that the screen potential of this pentode has just been raised to its upper level. The next advancing pulse from resistor 76*a* is then effective to render pentode 65*a* conductive. Thereupon, point 66*a* drops suddenly in potential, whereby a negative pulse is passed by condenser 63*a* to the grid of triode 64*b*, increasing its impedance. Point 66*b* rises in potential suddenly, so that a positive pulse is transferred by condenser 63*b* to the grid of triode 64*a*, reducing its impedance. Point 66*a* drops further in potential, causing a negative pulse to be transferred by 63*a* to the grid of 64*b*. These interactions between the two branches continue until ultimately the tube 64*b* is at sustained cut-off condition and tube 64*a* at substantially zero bias and conductive. In short, the circuit has tripped from off to on state. It may be tripped back to off state by a restoring pulse from resistor 69 applied to the grid of pentode **65*b*. Supposing the circuit to be in on state, the anode of 65*b* is at high potential. Assume the screen potential of 65*b* has just been raised. The next restoring pulse applied to the grid of 65*b* is therefore effective to render it conductive. Point 66*b* drops suddenly in potential, whereby a negative pulse is passed by condenser 63*b* to the grid of triode 64*a*, increasing its impedance. Point 66*a* thereupon rises suddenly in potential and a positive pulse is passed by 63*a* to the grid of triode 64*b* reducing its impedance. The interactions between the branches ultimately brings the tube 64*a* to a sustained cut-off condition and the tube 64*b*** to a fully conductive condition. In short, the circuit has been tripped from on to off status.

It is seen that the pentodes **65*a* and 65*b* provide conditioning controls whereby the tripping pulses from resistors 76*a* and 69 are selectively rendered effective, depending on the screen and anode potentials of the pentodes, to reverse the status of the circuit. In view of the fact that the resistors 69 and 76*a* terminate at line 51 which is considerably negative to the line 55** to which the cathode of the pentodes are connected, the grids of the pentodes are at negative cut-off bias in the absence of pulses upon the resistors or upon the appearance of the negative pulses on the resistors. Only the positive pulses on the resistors are therefore effective to raise the grid potentials of the pentodes sufficiently to render conductive any one of them which is at high anode and high screen potential.

Where conditioning controls over the effectivity of tripping pulses upon the trigger circuit are not needed, the trigger circuit omits the pentodes **65*a* and 65*b*. Circuit FR is such a trigger circuit. It is reversible from off to on state by a positive pulse applied from a source (not shown) through a condenser 59*b* to the point 67*b*, and from on to off state by a positive pulse applied to its point 67*a* via condenser 59*a*** from a pulse source (not shown).

The tripping pulses for the trigger circuits should be considerably sharper than the pulses which are passed by the condensers **63*a* and 63*b*** during the course of the triggering actions.

In practice, an efficient trigger circuit is obtained when the resistors numbered 60 and 62 are each one-third the value of the resistors numbered 61 and when the condensers **63*a* and 63*b*** are each in the order of a few micromicrofarads.

It may be noted that the common cathode of the tubes **64*b* and 65*b* of the circuit C3 alone is connected to line 55 by a switch 82*b*** normally in closed position. The reason for this will be explained later.

The commutator, as now understood, includes the trigger circuits C3, C2, and C1 which may be called the commutator stages. Means are provided for so interrelating these stages that they may operate sequentially in a forward or in a reverse direction. For convenience, the forward direction is considered here as the one in which C3, C2, and C1 are switched on in sequential order. The reverse direction is, then, the one in which C1, C2, and C3 are tripped on in a sequential manner. The interrelating means includes means for controlling the screen potentials of pentodes **65*a* and 65*b*** in such manner that the stages may be operated in sequence and in a chosen direction. The arrangement is such that each circuit when tripped on controls the circuit following it in the chosen direction to be tripped on, and the circuit preceding it in the chosen direction to be tripped off. The direction of commutator operation is governed by the status of circuit FR. When FR is on, it selects the forward direction, but when off, it selects the reverse direction of operation. The circuit FR as well as the commutator stages function through the interrelating means which will now be described.

This interrelating means includes six duplex tubes, each with two triode sections F and R. Tubes **3*a* and 3*b* relate to the left and right hand branches of stage C3. Similarly, tubes 2*a* and 2*b* relate to C2, and tubes 1*a* and 1*b* relate to C1. The anodes of both sections F and R of each tube are connected via a common load resistor 92 to line 50. The common cathode of both sections of each tube are connected via a cathode resistor 93 to line 55. The grids of the sections of the several duplex tubes variously tap six resistors, two to each commutator stage. Resistors 3F and 3R pertain to C3, resistors 2F and 2R pertain to C2, and resistors 1F and 1R pertain to C1**.

Each pair of similarly numbered resistors is connected at its upper end to point **66*b* of the associated commutator stage; e. g., resistors 3F and 3R are joined at their upper ends to point 66*b* of C3. The lower ends of the F-lettered resistors connect to a wire FF which taps resistor 62*b* of circuit FR. The lower ends of the R-lettered resistors connect to a wire RR which taps resistor 62*a* of circuit FR. It is evident that the potentials of the tapped points of the resistors 3F, 2F, 1F, and 3R, 2R, and 1R are determined jointly by the circuit FR and the commutator stages. There are four possible combinations of conditions of circuit FR and each stage. The circuit FR and a stage may both be on, or may both be off, or FR may be off while the stage is on, or FR may be on while the stage is off. When FR is on, the tapped point of its resistor 62*a* is at low potential while the tapped point of resistor 62*b* is at its high potential. In the off state of FR, the point of resistor 62*b* is at low potential, while that of 62*a* is at high potential. Hence, with FR on, the lower ends of resistors 3F, 2F, and 1F are at upper potential levels while the lower ends of resistors 3R, 2R, and 1R are at lower potentials. With FR off, the situation is reversed. When a commutator stage is on, its point 66*b* is at high potential, so that the upper ends of the related resistors are at high potential. Assuming that FR is on and C3, for example, is on, the lower and upper ends of resistor 3F are at their upper potential levels. Under this condition, the tapped point of 3F is near the potential of line 55. Further with FR and C3 on, the lower end of resistor 3R is at its lower potential level and though its upper end is at high potential, the tapped point assumes a potential considerably under that of line 55. On the other hand, if FR is off while C3 is on, the lower ends of resistors 3R and 3F are at their high and low potentials respectively, while the upper ends of these resistors are at their high potentials. Hence, the tapped point of 3R is then near the potential of line 55 while the tapped point of 3F is considerably lower in potential. If C3 is off, the upper ends of both 3F and 3R are at their low potential level. Under this condition, whether FR is on or off, the tapped points of both 3F and 3R are considerably lower in potential than line 55. Similarly, the potentials at the tapped points of 2F and 2R** are under joint control of C2 and FR, while the potentials at such points of 1F and 1R are under joint control of C1 and FR.

From the foregoing, it is clear that only when FR is on, to select forward operation, will the tapped points of resistors 3F, 2F, and 1F be brought to their upper potential, near that of line 55, under the further control of stages C3, C2, and C1, and only when FR is off, to select reverse operation, will the tapped points of 3R, 2R, and 1R be brought to upper potential under further control of the stages.

The resistors 3F, 2F, and 1F are tapped by the grids of sections F of the duplex tubes while resistors 3R, 2R, and 1R are tapped by the grids of tube sections R. When the tapped point of a resistor is at its low potential, near that of line 56, the tube sections which have their grids connected to this point are at cut-off bias. But if the tapped point of a resistor is at its upper potential, near that of line 55, the tube sections which have their grids connected to this point are at substantially zero bias and the tube sections are conductive. When both sections of a tube are at cut-off, the junction between its cathode and cathode resistor 93 is at the potential of line 55, and this is the low potential level of the junction point. But if either section of a tube is conductive, current flows from line 50 via the load resistor 92, through the conductive tube section, and via the cathode resistor 93 to line 55. Under this condition, the junction point of the cathode and cathode resistor is above the potential of line 55, and this is the high potential level of the junction point. The junction points of the cathodes and cathode resistors of the duplex tubes are connected to the screens of the pentodes 65*a* and 65*b* of the associated commutator stages. Specifically, the junction point 3*aj* is connected to the screen of 65*a* of C3, the junction point 3*bj* is connected to the screen of the pentode 65*b* of C3, the junction points 2*aj* and 2*bj* are connected to the screens of 65*a* and 65*b*, respectively of C2, and the junction points 1*aj* and 1*bj* are connected to the screens of 65*a* and 65*b*, respectively of C1. When such junction point is at its low potential level, the connected screen of a pentode is at its lower potential level and blocks the pentode regardless of its anode and grid potentials. But if a junction point is at its upper potential, the connected pentode screen is at high potential and allows the pentode to become conductive in response to a tripping pulse applied to the control grid and on condition that its anode potential also is high. The connections between the tapped points of resistors 3F, 2F, 1F, 3R, 2R, and 1R and the grids of the sections F and R of the duplex tube are given below in convenient table form:

| Resistors | Connecting Wire | Tube Sections |
|---|---|---|
| 3F | 3*f* | F (2*a*) and F (1*b*) |
| 2F | 2*f* | F (3*b*) and F (1*a*) |
| 1F | 1*f* | F (3*a*) and F (2*b*) |
| 3R | 3*r* | R (2*b*) and R (1*a*) |
| 2R | 2*r* | R (3*a*) and R (1*b*) |
| 1R | 1*r* | R (3*b*) and R (2*a*) |

Operation of the commutator in forward direction will now be explained in detail. For this direction of operation, direction control circuit FR is adjusted to on status. Assume the commutator is in starting condition, in which C3 is on and C2 and C1 are off. With FR on, the tapped points of the resistors 3F, 2F and 1F only will be brought to their upper potentials under the further control of the commutator stages. Since C3 now is on, its point 66*b* is at high potential, so that the upper end of 3F also is at high potential, and its tapped point is at a potential near that of line 55. As C2 and C1 are now off, the upper ends of 2F and 1F are at low potentials, as are their tapped points. Thus, in the assumed phase of the commutator, only the tapped point of 3F is at its upper potential. Accordingly, the F sections of tubes 2*a* and 1*b* are conductive, so that the junction points 2*aj* and 1*bj* are at their upper potentials, as are the screens of 65*a* (C2) and 65*b* (C1). Since C1 is now off, its pentode 65*b* is conductive. The only possible effect of a restoring pulse upon 65*b* (C1) would be to render it conductive, a condition it already has. Hence, during the very first cycle of commutator operation, the increase in screen potential of 65*b* (C1) may be neglected. In subsequent cycles, as will be made clear, the increase in screen potential of 65*b* (C1) is necessary to prepare C1 to be returned from on to off state. Regarding C2, also in off state, its point 66*a* and, hence, the anode of 65*a* (C2), is at high potential. The screen potential of 65*a* (C2) also has now been increased, as explained above. Accordingly, the next advancing pulse, from resistor 76*a*, is effective to render this pentode conductive. As a result, C2 is tripped on in the manner explained before. The occurrence of this action is indicated in line 4 of Fig. 2.

Figure 2:
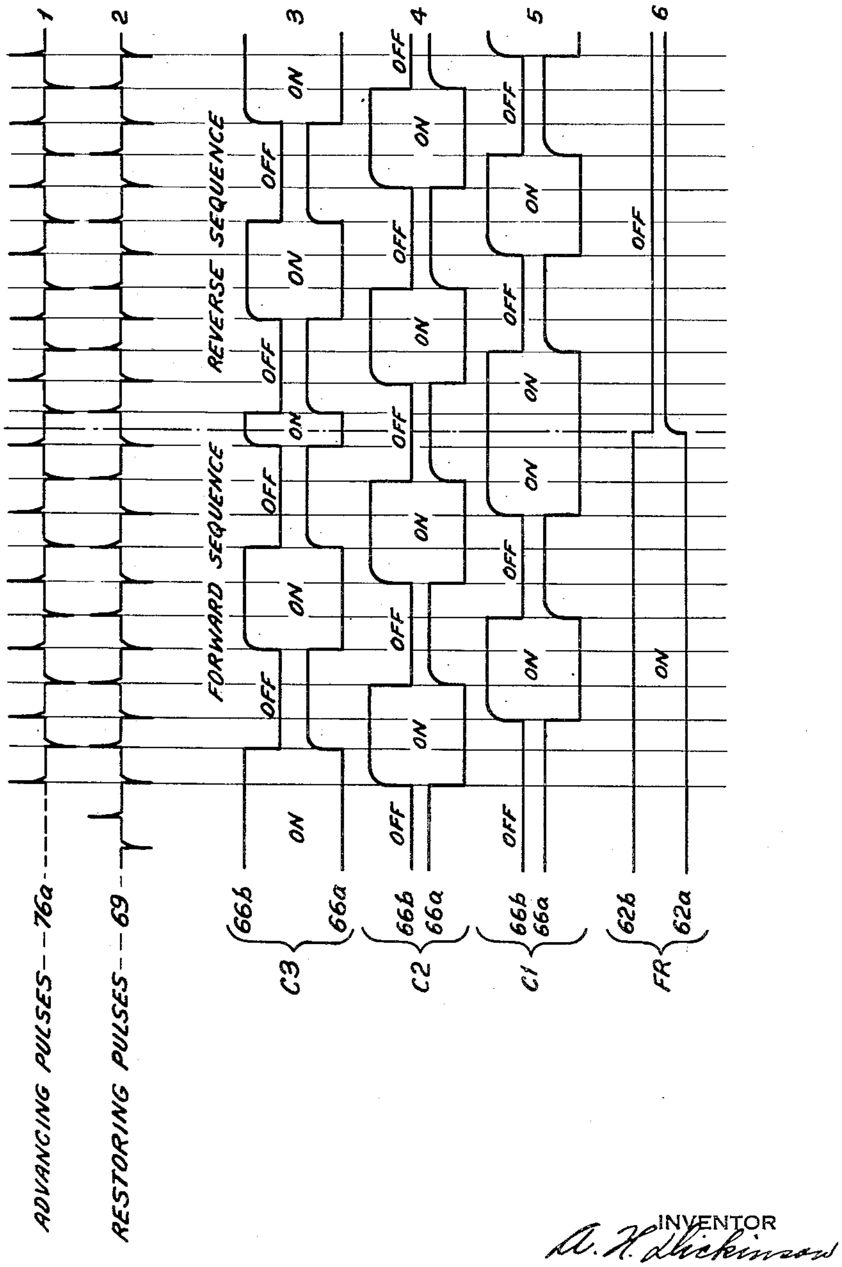
Fig. 2 is a chart indicating the different series of pulses for operating the commutator and the waves of potential produced by the commutator stages.

C2, having been turned on, its point 66*b* is at high potential, as is the upper end of resistor 2F. Accordingly, the tapped point of 2F rises to its upper potential level, whereby the sections F of tubes 3*b* and 1*a* become conductive. Junction points 3*bj* and 1*aj* rise in potential as do the screens of 65*b* (C3) and 65*a* (C1). With C3 still on, its point 66*b* and the anode of its pentode 65*b* are at high potential. Hence, the next restoring pulse from resistor 69 is effective to render 65*b* (C3) conductive, whereby C3 is tripped off. The occurrence of this action is indicated in Fig. 2, line 3. As for C1, it is still in off condition, so that its point 66*a* and the anode of 65*a* (C1) are at high potential. Hence, the next advancing pulse renders 65*a* (C1) conductive, turning on C1.

In the foregoing manner, when C2 is turned on, it conditions C3 to be turned off and then C1 to be turned on.

With C1 on, its point 66*b* is at high potential as is the upper end of resistor 1F. Accordingly, the tapped point of 1F rises in potential as do the grids of sections F of tubes 3*a* and 2*b*. These tubes become conductive, so that junction points 3*aj* and 2*bj* and the screens of 65*a* (C3) and 65*b* (C2) attain their upper potential levels. Since C2 is still on, the anode of 65*b* (C2) is high in potential. Accordingly, the next restoring pulse from resistor 69 renders 65*b* (C2) conductive, tripping C2 off. As for C3, it is still off and, therefore, the anode of 65*a* (C3) is at high potential. Hence, the following advancing pulse from 76*a* renders 65*a* (C3) conductive, turning on C3 again.

C3 being on, the screens of 65*a* (C2) and 65*b* (C1) are at their upper potential levels, as previously explained. With C1 now on, its pentode 65*b* is at high anode potential. Hence, the next restoring pulse from resistor 69 turns off C1. As for C2, it is turned on by the next advancing pulse, as described before. Thus, when C3 is turned on, it conditions C1 to be tripped off and C2 to be tripped on. This is the case except in the starting phase when C1 already is off at the time C3 is on.

Reference to Fig. 2 indicates the sequential occurrence of the on and off switching of the stages. At the start C3 is on and conditions C1 to go off and C2 to go on. The next advancing pulse turns on C2. Momentarily both C3 and C2 are concurrently in on state. C2, in on state, prepares C3 to be turned off and C1 to be turned on. The next restoring pulse turns off C3, while the following advancing pulse turns on C1. Momentarily, both C2 and C1 are simultaneously on. With C1 now on, it conditions C2 to be turned off and C3 to be turned on again. The next restoring pulse turns off C2 and turns on C3, starting a new cycle. Briefly, C3, C2, and C1 are switched on succesively during a forward cycle and also switched off successively during the cycle. The switching sequence, in forward direction, is C3 on, C1 off, C2 on, C3 off, C1 on, C2 off, and C3 on again, in cyclic manner.

Operation in the forward direction continues until the direction control circuit FR is switched to its off status. This may be done at any phase of the forward operation of the commutator. Assume that FR is switched off at the time indicated by the dot and dash lines in Fig. 2. At this time, C1 is at the trailing end of an on period, C2 has been turned off, and C3 has just been turned on. With FR now turned off, only resistors 3R, 2R, and 1R can have their tapped points raised to effective potential.

C1, being still on, while FR is now off, the tapped point of resistor 1R is brought to its high potential level. Accordingly, tubes 3*b* and 2*a* are conductive, so that points 3*bj* and 2*aj*, and the screens of 65*b* (C3) and 65*a* (C2), are at high potentials. Since C3 is in on status, the anode of 65*b* (C3) also is at high potential. Hence, the next restoring pulse from 69 turns off C3. As for C2, it is off so that 65*a* (C2) is also at high anode potential, so that the next advancing pulse turns on C2. Thus, when the commutator is conditioned for reverse operation, C1 being in the on state controls C3 to be turned off and C2 to be turned on. As was shown, when the commutator was conditioned for forward operation, C1, when on, controlled C3 to be turned on and C2 to be turned off. It is evident, then, that the on status of C1 has one effect on each of stages C3 and C2 when forward operation is called for and an opposite effect when reverse operation is called for. As will be clear, the same is true of C2 and C3 when either is in on state.

To continue with the explanation of the reverse operation, C2 has now been turned on and C3 has been turned off. Momentarily, C1 and C2 are concurrently on. With C2 on, the tapped point of 2R is at higher potential, so that tubes 3*a* and 1*b* are conductive. Accordingly, the points 3*aj* and 1*bj* and the screens of 65*a* (C3) and 65*b* (C1) are at increased potential. Since C1 is still on, the anode of 65*b* (C1) also is at high potential, so that the next restoring pulse turns off C1. As for C3, it is still off and, therefore, the anode of 65*a* (C3) is also at high potential. Hence, the next advancing pulse turns on C3. C2 and C3 are momentarily on concurrently. C3, being on, the potential of the tapped point of 3R is at increased potential, so that tubes 2*b* and 1*a* are conductive. Hence, points 2*bj* and 1*aj* and the screens of 65*b* (C2) and 65*a* (C1) are at their higher potential. As C2 is still on, the anode of 65*b* (C2) is also at high potential, so that the next restoring pulse turns off C2. As for C1, as yet in off state, its pentode 65*a* is at high anode potential and since its screen potential also has been raised, the next advancing pulse succeeds in turning on C1 again, starting a second reverse cycle.

Briefly, during reverse direction of operation, the sequence of switching is C1 on, C3 off, C2 on, C1 off, C3 on, C2 off, and C1 on again, in cyclic manner.

It is clear that, regardless of the direction of operation, a given commutator stage cannot be turned on until the stage preceding it in the chosen direction has been turned on, and that a given stage cannot be turned off until the stage following it in the chosen direction has been turned on. With this arrangement, therefore, step-by-step progression, either forwardly, or reversely, within the ring of stages is entirely positive in character. It will be understood that since the commutator stages are placed on and off sequentially, either forwardly, or reversely, a series of sequential voltage changes at points of the stages is produced either forwardly or reversely. Reference to Fig. 2, lines 3 to 5, indicates the respective distribution of the sequential times at which points 66*b* and 66*a* of the stages are at high and low potentials during both forward and reverse operations. It will be appreciated that when point 66*b* of a stage is reversed in potential, the point 66*a* is simultaneously reversed to a relatively opposite potential. Thus, sequential voltage changes occur not only of points 66*b* but also of points 66*a*, and the same is true of points 67*a* and 67*b*. Such sequential, timed voltage changes may be employed for the control and operation of work circuits.

Operation of the commutator in either direction may be interrupted by reversing the switch 88 from the position shown in Fig. 1. In the reversed position of switch 88, the application of on pulses from resistor 76*a* to the commutator is suspended, whereby the advance of the on state in the commutator is interrupted. The application of the off pulses from resistor 69 will continue, so that the commutator stage last conditioned to be turned off will be brought to this state by an off pulse even after switch 88 has been reversed. It is evident, then, that upon the reversal of switch 88 to suspend operation of the commutator, the stage last turned on will stay on while the other stages will be off. Upon the return of switch 88 to the position shown, the on pulses again will be applied to the commutator and sequential operation of the commutator in the chosen direction will resume. It is clear, then, that there is no necessity for restarting the commutator from any arbitrary phase thereof.

To recapituate, the commutator of the form shown in Fig. 1 comprises essentially a number of stages, each including a trigger circuit. These stages are operatively, electrically connected into a closed chain or ring, the number of stages employed being dependent upon the number of steps through which the accumulator is to progress during a cycle. In the illustrated embodiment, three stages are employed to provide for three steps of operation of the commutator during a cycle. Each step of operation embodies two switching actions; namely, the switching on of one stage and the switching off of a preceding stage. With respect to the individual switching actions, it is seen that this commutator provides twice as many switching actions during a cycle as the number of stages in the commutator. With respect to any particular switching action, such as the on switching action, there is the same number of like switching actions as the number of stages. It has also been shown that the commutator may be operated in either of opposite directions, in one of which a forward sequence of operations of the stages is effected and in the other of which a reverse sequence of operations of the stages takes place. A change in direction will be effected under control of a direction control circuit. Regardless of the direction of operation of the commutator, each stage will be turned on and off in succession, and each stage when turned on will condition a following stage to be turned on by an on tripping pulse. Further, such following stage upon being turned on will condition the preceding stage to be turned off by an off tripping pulse. Operation of the commutator in either direction will continue until the application of advancing pulses is interrupted. When the advancing pulses are again applied, the commutator will resume sequential operation from the point at which its operation was suspended.

Upon the switching of the lines 50 and 51 to a source of potential, the commutator may assume a chance condition which is different than any of the sequential phases of the commutator in either direction. For example, all the stages may assume off states or all may assume on states when potential is switched to lines 50 and 51. Accordingly, before sequential operation in either direction is started, a conditioning operation is effected to insure the placing of the commutator in starting condition. For this reason, before commutator operation in the chosen sequence is started, the switch 88 and the switch blades 82*a* and 82*b* are reversed from the positions shown in Fig. 1. If desired, blades 82*a* and 82*b* may be connected to a common operating handle.

With blade 82*b* in reverse position, the common cathodes of tubes 64*b* and 65*b* of the stage C3 is disconnected from line 55, opening the current path through these tubes. With tube 64*b* in nonconductive condition, its anode potential and the potential of connected point 66*b* are at high levels. As a result, stage C3 is conditioned to its on status.

With blade 82*a* in reverse position, the #1 grid of mixer tube 77 is connected to the wire which taps resistor 76*a* and is disconnected from line 51. As long as the #1 grid was connected to line 51, it was at constant high negative bias, now with the #1 grid connected to the resistor 76*a*, its bias rises above and falls below the potential of line 51 in response to the positive and negative pulses received from resistor 76*a*. The #3 grid remains connected to resistor 76*a*, as before. It is seen, then, that with switch 82*a* in reverse position, the #1 and #3 grids concurrently receive the pulses from resistor 76*a*. Therefore, the amplitude of current changes in the tube 77 is now greater than when the #1 grid was connected to line 51. Correspondingly, the voltage changes at the output of tube 77 are of increased amplitude, so that the positive pulses now produced upon resistor 69 are greater in amplitude than those produced during normal operation, when switch 82*a* is in the shown position. Such positive pulses of increased amplitude are received by the control grids of tubes 65*b* of the commutator stages. As far as stage C3 is concerned, the pulses received by the control grid of its tube 65*b* are now without effect because, switch 82*b* having been reversed, this tube is now maintained non-conductive. But the positive pulses of increased amplitude which are applied to the control grids of the tubes 65*b* of C2 and C1 are effective to turn off C2 and C1, whether the screen and anode potentials of these tubes are at their high or low levels.

In the foregoing manner, the commutator is initially conditioned to the starting phase in which the stage C3 is on and the stages C2 and C1 are off. After this conditioning operation has been effected, the switch 88 is placed in the position shown, so as to allow the on pulses from resistor 76*a* to be applied to the commutator, and then the switches 82*a* and 82*b* are set to the positions shown. Regular operation of the commutator then will take place in the direction chosen by the status of the control circuit FR.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic commutator or the like comprising opposite voltage supply lines, a series of parallel trigger circuits across said lines, each trigger circuit being of the dual stability type and including electronic tube means to which priming and pulse potential are applied to reverse the trigger circuit from one state to an alternative state, coupling circuits interconnecting said trigger circuits and selectively conditioned to transfer priming potential produced by one trigger circuit to the tube means of either the next trigger circuit in a forward commutating sequence or the next trigger circuit in a reverse commutating sequence, switching means connected to said coupling circuits for selectively pre-conditioning them to apply the priming potential in the forward or the reverse sequence, and a circuit connected to the tube means of the entire series of trigger elements for simultaneously applying pulses thereto, each pulse being effective only upon the tube means to which priming potential is being applied, whereby the pulses are effective to reverse the trigger circuits in the same selected sequence in which they are primed.

2. An electrical system including a group of discrete electronic trigger circuits, each having a certain status or an opposite status, selectively conditionable means connected to said trigger circuits for selectively and electrically coupling the circuits for tripping to the same status in either one sequence or an alternative sequence in response to successive pulses applied to the group of trigger circuits, a controlling trigger circuit connected to said coupling means and having one status in which it conditions the coupling means to interrelate said group of circuits for one of said sequences and reversible in status to condition the coupling means alternatively to interrelate said group of circuits for the alternative sequence, and means connected to said group of trigger circuits for applying a train of pulses thereto to trip them in the sequence called for by the condition of the coupling means.

3. An electronic commutator or the like, comprising opposite voltage lines, a group of electronic trigger circuits connected in parallel across said lines, each circuit having one status or a reverse status and operable upon being primed to be reversed in status in response to an applied pulse, sequence selecting means having alternative conditions, one to select a forward sequence of operation and the other to select an opposite sequence of operation for the trigger circuits, a group of electrical devices connected to and commonly controlled by the sequence selecting means and each individually connected to and controlled by an associated one of the trigger circuits to effect priming of another of the trigger circuits selectively depending on the condition of the sequence selecting means when the associated trigger circuit is in a particular status, and means connected to said trigger circuits for applying pulses to the primed circuits to reverse their status in either selected sequence.

ARTHUR H. DICKINSON.

REFERENCES CITED

The following references are of record in the file of this patent:

UNITED STATES PATENTS

| Number | Name | Date |
|---|---|---|
| 546,553 | Porter | Sept. 17, 1895 |
| 1,346,493 | Hammond et al. | July 13, 1920 |
| 1,690,279 | Craft | Nov. 6, 1928 |
| 1,723,499 | Bryce | Aug. 6, 1929 |
| 1,916,624 | Mansel | July 4, 1933 |
| 2,008,909 | Hershey | July 23, 1935 |
| 2,148,578 | Pullis | Feb. 28, 1939 |
| 2,158,285 | Koch | May 16, 1939 |
| 2,281,396 | Vibbard | Apr. 28, 1942 |
| 2,306,386 | Hollywood | Dec. 29, 1942 |
| 2,325,764 | Gall | Aug. 3, 1943 |
| 2,402,989 | Dickinson | July 2, 1946 |
| 2,409,229 | Smith et al. | Oct. 15, 1946 |
| 2,428,990 | Rajchman | Oct. 14, 1947 |
| 2,442,428 | Mumma | June 1, 1948 |
| 2,462,275 | Morton et al. | Feb. 22, 1949 |